(12) United States Patent
Easley et al.

(10) Patent No.: US 7,466,813 B1
(45) Date of Patent: Dec. 16, 2008

(54) ENHANCED CALL RETURN IN A WIRELESS TELEPHONE NETWORK

(75) Inventors: Larry Scott Easley, Lawrenceville, GA (US); Donald M. Cardina, Lawrenceville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 279 days.

(21) Appl. No.: 10/273,861

(22) Filed: Oct. 18, 2002

Related U.S. Application Data

(63) Continuation of application No. 09/471,770, filed on Dec. 23, 1999, now Pat. No. 6,496,691.

(51) Int. Cl.
*H04M 3/42* (2006.01)

(52) U.S. Cl. .............................. 379/210.01; 379/88.02; 379/355.01; 455/413; 455/415; 455/565; 714/4

(58) Field of Classification Search .................. 455/567, 455/413, 433, 565, 41.1, 415; 714/4; 379/355.01, 379/88.02, 91.02, 210.01
See application file for complete search history.

(56) References Cited

U.S. PATENT DOCUMENTS

| | | | |
|---|---|---|---|
| 5,396,613 A * | 3/1995 | Hollaar | 714/4 |
| 5,506,888 A * | 4/1996 | Hayes et al. | 455/445 |
| 5,905,958 A | 5/1999 | Houde | |
| 5,907,803 A | 5/1999 | Nguyen | |
| 5,920,820 A | 7/1999 | Qureshi et al. | |
| 5,995,848 A | 11/1999 | Nguyen | |
| 6,061,560 A | 5/2000 | Saboorian et al. | |
| 6,094,574 A | 7/2000 | Vance et al. | |
| 6,263,056 B1 | 7/2001 | Gruchala et al. | |
| 6,282,416 B1 | 8/2001 | Verdonk | |
| 6,317,484 B1 * | 11/2001 | McAllister | 379/88.02 |
| 6,321,078 B1 | 11/2001 | Menelli et al. | |
| 6,330,079 B1 * | 12/2001 | Dugan et al. | 358/403 |
| 6,373,931 B1 | 4/2002 | Amin et al. | |
| 6,819,945 B1 * | 11/2004 | Chow et al. | 455/567 |
| 2001/0051534 A1 | 12/2001 | Amin | |
| 2007/0093245 A1 * | 4/2007 | Easley | 455/433 |
| 2007/0133783 A1 * | 6/2007 | Urban et al. | 379/355.01 |

OTHER PUBLICATIONS

WIN TIA/EIA-41, Chapter-3, Revision-D, Modifications (IS-771) (Jan. 19, 1999), pp. 4-18, 4-20, 4-23, 4-24, 4-36, 4-38.

WIN TIA/EIA-41, Chapter-3, Revision-D, Modifications (PN-3661), pp. 4-55, 4-56, 4-63, 4-64, 4-72, 4-73, 4-74, 4-76, 4-77, 4-98 to 4-110.

WIN TIA/EIA-41, Chapter-5, Revision-D, Modifications (PN-3661), pp. 5-17 to 5-20, 5-22 to 5-26, 5-31 to 5-35, 5-41, 5-47, 5-51 to 5-53.

(Continued)

*Primary Examiner*—MD S Elahee
(74) *Attorney, Agent, or Firm*—Withers & Keys, LLC

(57) ABSTRACT

A method for providing enhanced call return in a wireless network is disclosed. The method includes receiving a call placed to a mobile subscriber from a caller, determining whether the mobile subscriber is a subscriber to an enhanced call return service, loading a mobile subscriber mailbox with caller-specific information, establishing a connection between the mobile subscriber and the mobile subscriber mailbox, retrieving caller-specific information from the mobile subscriber mailbox, and placing a return call to the caller.

29 Claims, 25 Drawing Sheets

OTHER PUBLICATIONS

TIA/EIA-41, Chapter-5, Revision-D, Modifications, pp. 55 to 57 (TIA/EIA/IS-764).
PPC TIA/EIA-41, Chapter 5, Revision-D, Modifications (PN-4287), p. 5-28.
ANSI-41, Chapter 5, Revision-D, Protocol Enhancements (PN-3890), p. 14 (second revision).
Bell Communications Research, Technical Reference, TR-NWT-001188, Issue 1, Dec. 1991, pp. 75-77, 82-85.

* cited by examiner

| RegistrationNotification INVOKE Parameters | | |
|---|---|---|
| Field | Value | Type |
| Identifier | SET [NATIONAL 18] | M |
| Length | variable octets | M |
| Contents | | |
| ElectronicSerialNumber | | M |
| MobileIdentificationNumber | | M |
| MSCID (Serving MSC) | | M |
| QualificationInformationCode | | M |
| SystemMyTypeCode (Serving MSC or VLR) | | M |
| AvailabilityType | | O |
| BorderCellAccess | | O |
| ControlChannelData | | O |
| ExtendedMSCID (VLR) | | O |
| LocationAreaID | | O |
| PC_SSN (Serving MSC or VLR) | | O |
| ReceivedSignalQuality | | O |
| ReportType | | O |
| SenderIdentificationNumber | | O |
| SMS_Address | | O |
| SMS_MessageWaitingIndicator | | O |
| SystemAccessData | | O |
| SystemAccessType | | O |
| SystemCapabilities | | O |
| TerminalType | | O |
| TransactionCapability | | O |
| WINCapability | | O |

| RegistrationNotification RETURN RESULT Parameters | | |
|---|---|---|
| Field | Value | Type |
| Identifier | SET [NATIONAL 18] | M |
| Length | variable octets | M |
| Contents | | |
| SystemMyTypeCode (VLR or HLR) | | M |
| AuthorizationDenied | | O |
| AuthorizationPeriod | | O |
| ControlChannelData | | O |
| DeniedAuthorizationPeriod | | O |
| Digits (Carrier) | | O |
| Digits (Destination) | | O |
| MSCID (HLR) | | O |
| Profile | | O |
| ReceivedSignalQuality | | O |
| SenderIdentificationNumber | | O |
| SMS_MessageWaitingIndicator | | O |
| SystemAccessData | | O |
| Trigger Address List | | O |

| LocationRequest INVOKE Parameters | | |
|---|---|---|
| Field | Value | Type |
| Identifier | SET [NATIONAL 18] | M |
| Length | variable octets | M |
| Contents | | |
| BillingID (Originating) | | M |
| Digits (Dialed) | | M |
| MSCID (Originating) | | M |
| SystemMyTypeCode (Originating) | | M |
| CallingPartyName | | O |
| CallingPartyNumberDigits1 | | O |
| CallingPartyNumberDigits2 | | O |
| CallingPartySubaddress | | O |
| MSCIdentificationNumber | | O |
| PC_SSN (Originating) | | O |
| RedirectingNumberDigits | | O |
| RedirectingPartyName | | O |
| RedirectingSubaddress | | O |
| TerminationAccessType | | O |
| TransactionCapability | | O |

| TR-1188 Invoke Message | |
|---|---|
| Parameter | Length (octets) |
| Package Type Identifier | 1 |
| Total TCAP Message Length | 1 |
| Transaction ID Identifier | 1 |
| Transaction ID Length | 1 |
| Originating Transaction ID | 4 |
| Component Sequence Identifier | 1 |
| Component Sequence Length | 1 |
| Component Type Identifier | 1 |
| Component Length | 1 |
| Component ID Identifier | 1 |
| Component ID Length | 1 |
| Component ID | 1 |
| Operation Code Identifier | 1 |
| Operation Code Length | 1 |
| Operation Family | 1 |
| Operation Specifier | 1 |
| Parameter Set Identifier | 1 |
| Parameter Set Length | 1 |
| Generic Name Identifier | 1 |
| Generic Name Length | 1 |
| Service Key Identifier | 1 |
| Service Key Length | 1 |
| Digits Identifier | 1 |
| Digits Length | 1 |
| Digits (Calling Directory Number) | 9 |
| ACG Encountered Identifier | 3 |
| ACG Encountered Length | 1 |
| ACG Encountered | 1 |

FIG. 7 (Prior Art)  38

| TR-1188 Return Result Message | |
| --- | --- |
| Parameter | Length (octets) |
| Package Type Identifier | 1 |
| Total TCAP Message Length | 1 |
| Transaction ID Identifier | 1 |
| Transaction ID Length | 1 |
| Responding Transaction ID | 4 |
| Component Sequence Identifier | 1 |
| Component Sequence Length | 1 |
| Component Type Identifier | 1 |
| Component Length | 1 |
| Component ID Identifier | 1 |
| Component ID Length | 1 |
| Component ID | 1 |
| Parameter Set Identifier | 1 |
| Parameter Set Length | 1 |
| Generic Name Identifier | 1 |
| Generic Name Length | 1 |
| Generic Name | variable |

FIG. 8 (Prior Art)

| TR-1188 Return Result Message | |
|---|---|
| Parameter | Length (octets) |
| Component Type Identifier | 1 |
| Component Length | 1 |
| Component ID Identifier | 1 |
| Component ID Length | 1 |
| Component ID | 1 |
| Operation Code Identifier | 1 |
| Operation Code Length | 1 |
| Operation Family | 1 |
| Operation Specifier | 1 |
| Parameter Set Identifier | 1 |
| Parameter Set Length | 1 |
| Digits Identifier | 1 |
| Digits Length | 1 |
| Digits | 7 |
| ACG Indicators Identifier | 2 |
| ACG Indicators Length | 1 |
| ACG Indicators | 3 |

FIG. 8 (continued) (Prior Art)

| ServiceRequest INVOKE Parameters | | |
|---|---|---|
| Field | Value | Type |
| Identifier | SET [NATIONAL 18] | M |
| Length | variable octets | M |
| Contents | | |
| ServiceID | | M |
| AccessDeniedReason | | O |
| AvailabilityType | | O |
| BillingID | | O |
| CallingPartyName | | O |
| CallingPartyNumberDigits1 | | O |
| CallingPartyNumberDigits2 | | O |
| CallingPartySubaddress | | O |
| ConditionallyDeniedReason | | O |
| DataAccessElementList | | O |
| Digits (Dialed) | | O |
| GroupInformation | | O |
| LegInformation | | O |
| LocationAreaID | | O |
| Mobile DirectoryNumber | | O |
| MobileIdentificationNumber | | O |
| MSCID (Invoking) | | O |
| MSCIN (Invoking) | | O |

| ServiceRequest INVOKE Parameters | | |
|---|---|---|
| Field | Value | Type |
| Identifier | SET [NATIONAL 18] | M |
| Length | variable octets | M |
| Contents | | |
| PC_SSN | | O |
| PilotBillingID | | O |
| PilotNumber | | O |
| PreferredLanguageIndicator | | O |
| RedirectingPartyName | | O |
| RedirectingNumberDigits | | O |
| RedirectingSubaddress | | O |
| RedirectionReason | | O |
| SenderIdentificationNumber | | O |
| ServingCellID | | O |
| SystemMyTypeCode | | O |
| TerminationAccessType | | O |
| TimeDateOffset | | O |
| TransactionCapability | | O |
| TriggerType | | O |
| WINCapability | | O |

| ServiceRequest RETURN RESULT Parameters | | |
|---|---|---|
| Field | Value | Type |
| Identifier | SET [NATIONAL 18] | M |
| Length | variable octets | M |
| Contents | | |
| AccessDeniedReason | | O |
| ActionCode | | O |
| AlertCode | | O |
| AnnouncementList | | O |
| CallingPartyName | | O |
| CallingPartyNumberString1 | | O |
| CallingPartyNumberString2 | | O |
| CallingPartySubaddress | | O |
| CarrierDigits | | O |
| Digits (Dialed) | | O |
| DisplayText | | O |
| DMH_AccountCodeDigits | | O |
| DMH_AlternateBillingDigits | | O |
| DMH_BillingDigits | | O |
| DMH_RedirectionIndicator | | O |
| GroupInformation | | O |
| MobileDirectoryNumber | | O |
| NoAnswerTime | | O |

| ServiceRequest RETURN RESULT Parameters | | |
|---|---|---|
| Field | Value | Type |
| Identifier | SET [NATIONAL 18] | M |
| Length | variable octets | M |
| Contents | | |
| RedirectingNumberDigits | | O |
| RedirectingNumberString | | O |
| RedirectingPartyName | | O |
| RedirectingSubaddress | | O |
| ResumePIC | | O |
| RoutingDigits | | O |
| TerminationList | | O |

| GeneralizedTime (GTIME) Parameter | | |
|---|---|---|
| Field | Value | Type |
| Identifier | GeneralizedTime IMPLICIT OCTET STRING | M |
| Length | variable octets | M |
| Contents | | |
| H \| G \| F \| E \| D \| C \| B \| A | | octet |
| Year | | 1 |
| Month | | 2 |
| Day of Month | | 3 |
| Time of Day | | 4 5 6 |

| RoutingRequest INVOKE Parameters | | |
|---|---|---|
| Field | Value | Type |
| Identifier | SET [NATIONAL 18] | M |
| Length | variable octets | M |
| Contents | | |
| BillingID (originating) | | M |
| ElectronicSerialNumber | | M |
| MobileIdentificationNumber | | M |
| MSCID (Originating MSC) | | M |
| SystemMyTypeCode (Originating MSC) | | M |
| AlertCode | | O |
| CallingPartyName | | O |
| CallingPartyNumberDigits1 | | O |
| CallingPartyNumberDigits2 | | O |
| CallingPartyNumberString1 | | O |
| CallingPartyNumberString2 | | O |
| CallingPartySubaddress | | O |
| DestinationDigits | | O |
| DisplayText | | O |
| DMH_AccountCodeDigits | | O |
| DMH_AlternateBillingDigits | | O |
| DMH_BillingDigits | | O |

| RoutingRequest INVOKE Parameters | | |
|---|---|---|
| Field | Value | Type |
| Identifier | SET [NATIONAL 18] | M |
| Length | variable octets | M |
| Contents | | |
| LegInformation | | O |
| LocationAreaID | | O |
| MobileDirectoryNumber | | O |
| MSCIdentificationNumber | | O |
| NoAnswerTime | | O |
| OneTimeFeatureIndicator | | O |
| PC_SSN (Originating MSC) | | O |
| PilotBillingID | | O |
| PilotNumber | | O |
| RedirectingNumberDigits | | O |
| RedirectingNumberString | | O |
| RedirectingPartyName | | O |
| RedirectingSubaddress | | O |
| SenderIdentificationNumber | | O |
| TerminationTreatment | | O |
| TerminationTriggers | | O |
| TriggerAddressList | | O |
| VoiceMailboxNumber | | O |
| VoiceMailboxPIN | | O |

| RoutingRequest RETURN RESULT Parameters | | |
|---|---|---|
| Field | Value | Type |
| Identifier | SET [NATIONAL 18] | M |
| Length | variable octets | M |
| Contents | | |
| MSCID (Serving) | | M |
| AccessDeniedReason | | O |
| BillingID (Anchor) | | O |
| ConditionallyDeniedReason | | O |
| Digits (Destination) | | O |
| MSCIdentificationNumber | | O |
| PC_SSN (Serving MSC) | | O |

| LocationRequest RETURN RESULT Parameters | | |
|---|---|---|
| Field | Value | Type |
| Identifier | SET [NATIONAL 18] | M |
| Length | variable octets | M |
| Contents | | |
| ElectronicSerialNumber | | M |
| MobileIdentificationNumber | | M |
| MSCID (Serving MSC) | | M |
| AccessDeniedReason | | O |
| AnnouncementList | | O |
| CallingPartyNumberString1 | | O |
| CallingPartyNumberString2 | | O |
| Digits (Carrier) | | O |
| Digits (Destination) | | O |
| Display Text | | O |
| DMH_AccountCodeDigits | | O |
| DMH_AlternateBillingDigits | | O |
| DMH_BillingDigits | | O |
| DMH_RedirectionIndicator | | O |
| GroupInformation | | O |
| MobileDirectoryNumber | | O |
| NoAnswerTime | | O |
| OneTimeFeatureIndicator | | O |
| PC_SSN (Serving MSC or VLR) | | O |
| RedirectingNumberDigits | | O |
| RedirectingNumberString | | O |
| RedirectingSubaddress | | O |
| RoutingDigits | | O |
| TerminationList | | O |
| TerminationTriggers | | O |

FIG. 14 (Prior Art) — 46

| OriginationRequest INVOKE Parameters | | |
|---|---|---|
| Field | Value | Type |
| Identifier | SET [NATIONAL 18] | M |
| Length | variable octets | M |
| Contents | | |
| BillingID (originating) | | M |
| Digits (Dialed) | | M |
| ElectronicSerialNumber | | M |
| MobileIdentificationNumber | | M |
| MSCID (Originating MSC) | | M |
| Origination Triggers | | M |
| TransactionCapability | | M |
| CallingPartyName | | O |
| CallingPartyNumberDigits1 | | O |
| CallingPartyNumberDigits2 | | O |
| CallingPartySubaddress | | O |
| LocationAreaID | | O |
| MobileDirectoryNumber | | O |
| MSCIdentificationNumber | | O |
| OneTimeFeatureIndicator | | O |
| PC_SSN (Originating MSC) | | O |
| PreferredLanguageIndicator | | O |
| SenderIdentificationNumber | | O |
| ServingCellID | | O |
| TriggerType | | O |
| WINCapability | | O |

| SeizeResource INVOKE Parameters | | |
|---|---|---|
| Field | Value | Type |
| Identifier | SET [NATIONAL 18] | M |
| Length | variable octets | M |
| Contents | | |
| PreferredLanguageIndicator | | O |
| PrivateSpecializedResource | | O |
| SpecializedResource (Standard) | | O |

FIG. 17 (Prior Art)

| SeizeResource RETURN RESULT Parameters | | |
|---|---|---|
| Field | Value | Type |
| Identifier | SET [NATIONAL 18] | M |
| Length | variable octets | M |
| Contents | | |
| DestinationDigits (TLDN) | | M |

FIG. 18 (Prior Art)

| ConnectResource INVOKE Parameters | | |
|---|---|---|
| Field | Value | Type |
| Identifier | SET [NATIONAL 18] | M |
| Length | variable octets | M |
| Contents | | |
| DestinationDigits (TLDN) | | M |
| CarrierDigits | | O |
| RoutingDigits | | O |

| InstructionRequest INVOKE Parameters | | |
|---|---|---|
| Field | Value | Type |
| Identifier | SET [NATIONAL 18] | M |
| Length | zero octets | M |
| Contents | | |

| SRFDirective INVOKE Parameters | | |
|---|---|---|
| Field | Value | Type |
| Identifier | SET [NATIONAL 18] | M |
| Length | variable octets | M |
| Contents | | |
| AnnouncementList | | O |
| DigitCollectionControl | | O |
| ExecuteScript | | O |
| MobileDirectoryNumber | | O |

60

| SRFDirective RETURN RESULT Parameters | | |
|---|---|---|
| Field | Value | Type |
| Identifier | SET [NATIONAL 18] | M |
| Length | variable octets | M |
| Contents | | |
| Digits (Dialed) | | O |
| ScriptResult | | O |

| InstructionRequest RETURN RESULT Parameters | | |
|---|---|---|
| Field | Value | Type |
| Identifier | SET [NATIONAL 18] | M |
| Length | zero octets | M |
| Contents | | |

| OriginationRequest RETURN RESULT Parameters | | |
|---|---|---|
| Field | Value | Type |
| Identifier | SET [NATIONAL 18] | M |
| Length | variable octets | M |
| Contents | | |
| AccessDeniedReason | | O |
| ActionCode | | O |
| AnnouncementList | | O |
| CallingPartyNumberString1 | | O |
| CallingPartyNumberString2 | | O |
| CallingPartySubaddress | | O |
| CarrierDigits | | O |
| Digits (Dialed) | | O |
| DisplayText | | O |
| DMH_AccountCodeDigits | | O |
| DMH_AlternateBillingDigits | | O |
| DMH_BillingDigits | | O |
| DMH_RedirectionIndicator | | O |
| GroupInformation | | O |
| MobileDirectoryNumber | | O |
| NoAnswerTime | | O |
| OneTimeFeatureIndicator | | O |
| PilotNumber | | O |
| RedirectingNumberDigits | | O |
| RedirectingNumberString | | O |
| RedirectingSubaddress | | O |
| ResumePIC | | O |
| RoutingDigits | | O |
| TerminationList | | O |
| TerminationTriggers | | O |
| TriggerAddressList | | O |

ENHANCED CALL RETURN IN A WIRELESS TELEPHONE NETWORK

This application is a continuation of U.S. patent application Ser. No. 09/471,770, filed Dec. 23, 1999 now U.S. Pat. No. 6,496,691.

STATEMENT REGARDING FEDERALLY SPONSORED RESEARCH OR DEVELOPMENT (Not Applicable)

BACKGROUND OF THE INVENTION

1. Field of the Invention

The present invention relates to wireless communication systems and, more particularly, to an implementation of an enhanced call return feature in a wireless telephone network.

2. Description of the Related Art

Contemporary telephone subscriber services may be divided into two major categories: (1) Wire line services; and (2) Wireless services. A wire line service typically utilizes a wired network of telephone cables or conductors. In other words, in a wire line network, telephone signals are transmitted over a physical wire path of, typically, copper conductors or wires. On the other hand, wireless services (e.g., cellular telephone service, personal communications service (PCS), etc.), as the name suggests, employ wireless means to carry telephone signals through the air (i.e., instead of wires) between a caller and callee. Although a telephone call originating in a wireless network may ultimately be transmitted through a wire line network to reach its destination, the principal mode of communication nonetheless still remains wireless in the wireless network. Typical examples of wire line telephone networks include the POTS (Plain Old Telephone System) and the more advanced PSTN (Public Switched Telephone Network). Some examples of land-based wireless telephone networks include the cellular (or mobile) telephone network and the personal communications network (PCN).

Both of the above-mentioned subscriber telephone services are governed by a number of corresponding regulatory standards and protocols that define how calls are to be treated in the respective system and which subscriber services may be provided. Some wire line service standards and protocols include the AIN (Advanced Intelligent Network) standard which may be considered as an upgrade to the SS-7 (signaling system number 7) standard, and the Internet Protocol (IP) for Internet-based telephony. Wireless telephone communication is also governed by a number of different standards and protocols, including the second generation TDMA (Time Division Multiple Access) air interface standard (popularly known as the IS-136 standard) and the wireless intersystems operation standard (alternately referred to as the IS-41 or the TIA/EIA-41 standard), both of which may be considered part of the WIN (Wireless Intelligent Network) standards.

The AIN protocol for the wire line network allows a telephone service provider to offer a variety of service options to a telephone line subscriber. Some of the services that may be offered by a telephone service provider include the telephone number portability service, the calling name service, the voice mail service, and the call return service. The call return feature allows a user (i.e., telephone line subscriber) to dial an access code, e.g., *69, to place a call to the calling party that last called the user's telephone number. This service is useful in a number of situations, e.g., when the calling party hangs up without giving the user a chance to pick up the phone, or when the user is aware of the phone call but unable to reach the phone and the calling party does not leave any message for the user.

Presently, a similar call return feature is absent for the subscribers of wireless telephone services. It is therefore desirable to implement the call return feature in wireless telephone networks.

SUMMARY OF THE INVENTION

The present invention contemplates a method for enabling enhanced call return in a wireless network comprising receiving an incoming telephone call from a caller, wherein the incoming telephone call identifies a mobile subscriber (MS) as a callee thereof; capturing caller-specific information for the caller, wherein the caller-specific information includes at least one of the name of the caller and the telephone number of the caller; and storing the caller-specific information into an intelligent peripheral (IP) within the wireless network. The method further comprises allowing the MS to access the caller-specific information stored in the IP.

The present invention further contemplates a wireless communication system comprising a line information data base (LIDB) configured to store caller-specific information therein, wherein the LIDB receives the caller-specific information when a caller originates a telephone call that identifies a mobile subscriber as a callee thereof; an originating mobile switching center (MSC) configured to receive the telephone call and to generate a first message in response thereto; a home location register (HLR) coupled to the originating MSC, wherein the HLR is configured to receive the first message and to responsively retrieve one or more parts of the call-specific information from the LIDB; and an intelligent peripheral (IP) coupled to the HLR, wherein the HLR is configured to transfer the one or more parts of the caller-specific information to the IP via a second message from the HLR to the IP.

The present invention allows the mobile subscriber (MS) to subscribe to an enhanced call return (ECR) feature as part of the mobile telephone service plan. The ECR feature allows the mobile subscriber to access caller-specific information for a predetermined number of past callers. The caller-specific information includes the caller's name, the caller's telephone number and the date/time the call was received from the caller. The MS may scroll the list of callers whose data are stored in the subscriber's mailbox in the IP to determine which caller(s) to return the call(s) to. The interaction between the MS and the IP may be voice-activated. While "talking" to the IP, the mobile subscriber may choose a specific caller to place a call to, or, alternately, the mobile subscriber may simply end the inquiry, albeit with the knowledge of who called that subscriber in the recent past.

DESCRIPTION OF THE DRAWINGS

Further advantages of the present invention may be better understood by referring to the following description taken in conjunction with the accompanying drawings, in which:

FIGS. 3-4 illustrate exemplary message formats for the prior art messages shown in the registration process depicted in FIG. 2;

FIGS. 6-14 illustrate exemplary message formats for the prior art messages used in the sequence of messages shown in FIG. 5;

FIGS. 16-20 illustrate exemplary message formats for some of the prior art messages used in the sequence of messages shown in FIG. 15;

FIGS. 22-24 illustrate exemplary message formats for the remainder of the prior art messages used in the sequence of messages shown in FIG. 15.

DETAILED DESCRIPTION OF PREFERRED EMBODIMENTS

Figure 1:
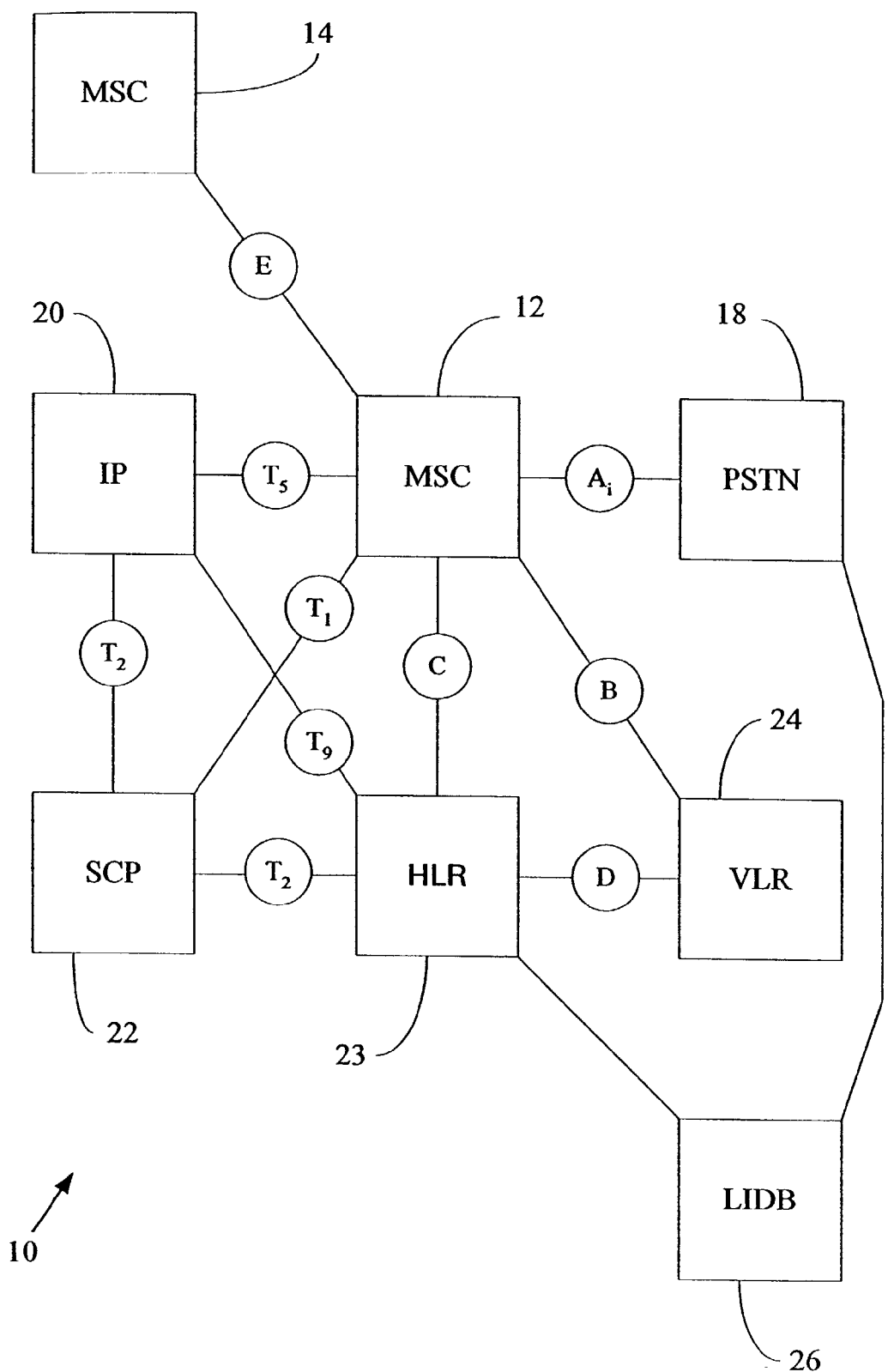
FIG. 1 shows a prior art wireless network reference model representing an interconnection of the network entities required to implement the enhanced call return feature.

Referring now to FIG. 1, a wireless network reference model 10 representing an interconnection of the network entities (NEs) required to implement the enhanced call return feature is illustrated. The network reference model 10 appears in Chapter-1 (or Part-1) of revision-D of the IS-41 (Interim Standard-41) wireless intersystem operation standard. The revision-D of the IS-41 standard is incorporated herein by reference in its entirety. Copies of the most recent revision (and/or earlier revisions) of the IS-41 standard may be obtained from the Global Engineering Documents, 15 Inverness Way East, Sales-C303B, Englewood, Colo., USA 80112-9649.

The IS-41 standard is more recently referred to as a TIA/EIA-41 standard, where 'TIA' stands for Telecommunications Industry Association and 'EIA' stands for Electronics Industry Association. However, the following discussion uses the designations IS-41 and TIA/EIA-41 interchangeably. Further, the term "wireless network" as used herein is contemplated to include analog or digital cellular mobile networks (irrespective of the underlying digital technology, e.g., CDMA, TDMA, etc.) and any other radio network that employs intersystem messaging (IS-41 based or not) as part of mobile wireless communication. Although the discussion herein focuses on IS-41 messages to accomplish enhanced call return in a wireless network, it is understood that the methodology described herein may be implemented with other non-IS-41 messages that may be functionally similar to those described hereinbelow.

It is known in the art that IS-41 is the technical standard that specifies the network model, functions, protocols, and services that provide mobile telecommunications networks intersystem operations. The IS-41 specification provides a standard protocol for the operations that enable subscriber mobility between two MSCs (Mobile Switching Centers) in a single wireless network or in two different wireless networks operated by a single or two different service providers. In other words, the IS-41 standard specifies the necessary-signaling mechanism to accomplish seamless communication in the mobile world. A brief description of each of the network entities is given below.

The network entities (NEs) in FIG. 1 include an anchor mobile switching center (MSC) 12, a visiting (or serving) MSC 14, a public switched telephone network (PSTN) 18, an intelligent peripheral (IP) 20, a service control point (SCP) 22, a home location register (HLR) 23, a visitor location register (VLR) 24, and a line information database (LIDB) 26. These network entities represent functional blocks or units that perform various logical functions that are implementation-independent. In other words, one or more of the above-mentioned network entities may be constructed in different physical configurations by different mobile service providers and, hence, the model shown in FIG. 1 does not imply either a specific physical implementation of a network entity shown therein or a specific interconnection between two or more network entities shown therein. For example, the discussion given hereinbelow identifies the VLR 24 as associated with the anchor MSC 12 as well as with the serving MSC 14. However, the diagram in FIG. 1 does not show a direct physical interconnection between the VLR 24 and the serving MSC 14. The sharing of the VLR 24 may be possible, for example, when both of the mobile switching centers 12, 14 are operated by a common service provider.

It is therefore emphasized that the arrangement shown in FIG. 1 is for illustration only. The network entities shown in FIG. 1 may not represent actual physical connection, especially when call-routing involves many more cells and, hence, many more network entities, in a wireless network. For example, in one embodiment, the serving MSC 14 may have its own HLR and VLR (not shown) and may be maintained by a service provider that is different from the service provider maintaining the anchor MSC 12 and its associated network entities. In short, the network topology in FIG. 1 is a symbolic representation of various functional blocks comprising a wireless network and does not imply a fixed, physical implementation of those functional blocks. A service provider may choose not to provide all the network entities or all the interconnections illustrated in FIG. 1 in a given geographic area or cell. Further, more than one functional unit may be implemented on a single physical device, or, alternatively, some functional blocks may represent separate physical devices. For example, the IP 20 may be a part of the HLR 23, which, may also include the SCP 22 when all of these functional units are physically implemented. On the other hand, the MSC 12 and the LIDB 26 may each be built as separate physical devices.

Each network entity is shown interconnected via interfaces represented by different interface reference points. For example, the anchor MSC 12 and the visiting (or serving) MSC 14 are shown connected via the interface reference point 'E', and the anchor MSC 12 and its associated HLR 23 are shown connected via the interface reference point "C". Other interface reference points are also illustrated in FIG. 1. These interface reference points represent the point of connection between two adjacent physical or logical network entities. A point of connection is defined by functional and signaling characteristics and may define the operational responsibility of the interconnected network entities. Thus, the signaling characteristic of the B interface may be different from that of the $T_1$ interface, and the signaling characteristic of the C interface may be different from that of the D interface, etc.

It is noted that the terms "mobile subscriber", "network subscriber" and "mobile user" are used interchangeably hereinbelow. A "mobile subscriber (MS)" (not shown) may be a human individual who has subscribed to one or more mobile wireless services. The term "mobile subscriber", as used herein, also includes a mobile service user who uses the subscribed wireless service(s) with a mobile telephone handset or with a computer equipped for wireless communication or with any other similar device. Further, "mobile communication" may include voice, data or any other information communicated via a mobile wireless network.

A mobile switching center (MSC) is a functional entity that represents an automatic wireless message switching system. An MSC may be distinguished from an MTSO (mobile telephone switching office), which may refer more to the physical architecture of the wireless switching office including switching hardware, the physical building, etc. An MSC typically provides interface for user traffic between a cellular network and other public switched networks (PSTNs) or other MSCs in the same or other networks. An MSC provides basic switching functions and coordinates the establishment of calls to and from cellular subscribers. Thus, an MSC is responsible for various call processing as well as mobile subscriber mobility management functions.

An MSC first receiving a call placed by a caller (calling a mobile subscriber) may be referred to as the "anchor MSC" (e.g., the MSC 12), whereas an MSC that finally delivers the call to the mobile subscriber (and thus completes the call) may be referred to as the "serving MSC" (e.g., the MSC 14). The geographic location of the mobile subscriber (MS) at the time of call reception (from the external telephone network, e.g., the PSTN 18 or other wireless network) determines whether the anchor MSC 12 and the serving MSC 14 are the same or different.

The functional block labeled "PSTN" 18 may include an external wire line telephone network carrying a call from an external network caller to a mobile subscriber (MS) (not shown) or vice versa. The $A_i$ interface represents an interconnection between the PSTN 18 and a switching center in the mobile network, here, the MSC 12. The PSTN 18 may include a digitally switched telephone network, the POTS (plain old telephone system), the Internet or other external networks, including a local area network (LAN) or other dissimilar mobile network. It is known that mobile networks usually interoperate with other networks (e.g., the PSTN 18) to complete calls.

The intelligent peripheral (IP) 20 may be a server or any other database capable of creating and storing "mailboxes" for those mobile subscribers who have subscribed to the enhanced call return service. A "mailbox" for an MS stores caller-specific information. The caller-specific information may later be retrieved by the MS through interaction with the IP 20 as discussed hereinbelow. The IP 20 is a network entity that provides and interprets information via local processing. In other words, the IP 20 itself may be capable of receiving and decoding operational commands from other network nodes and then executing those commands. In one embodiment, the IP 20 is part of the HLR 23. Alternatively, the IP 20 may be an independent physical entity in the wireless network. The IP 20 may be able to perform multiple activities, e.g., activities similar to those performed by the SCP 22. Further, the IP 20 may be SMS (short message service) capable. An SMS is a packet-switched messaging service that provides store-and-forward functions for the handling of short messages destined to or originated from the mobile subscribers.

A cellular wireless network may interconnect with an SS7 (Signaling System No. 7) network as a backbone network to transport IS-41 signaling messages through the mobile telecommunications network. SS7 packets may be used to convey signaling information from an originating point to a destination point through multiple switching nodes in the mobile network, which may encompass more than one wireless network operated by one or more service providers. SS7-based transactions may query databases and invoke functions at remote points throughout the mobile wireless network to establish and maintain calls and to perform reliable call management functions. An SS7 backbone network may be owned and operated by the same service provider as the one operating the interconnected wireless network. Alternatively, a wireless service provider may join an independent SS7 network provider to accomplish desired call routing. Service control points (SCPs) 22 are special types of end signaling points in an SS7 network that perform transaction processing of remote operations. The SCP 22 may support a database to perform the required operations, e.g., processing of calling card information. As noted hereinbefore, the HLR 23 may perform as an SCP in a given wireless network configuration.

The location registers, e.g., the HLR 23 and the VLR 24, are data-based systems that assist in controlling mobile subscriber services and contain the records and stored information related to mobile subscribers of a particular mobile service provider. The location registers are queried by other network entities to obtain the current status, location, and other information to support calls to and from mobile users within the wireless network. Location registers may also contain network address translation information to assist in the routing of calls to the appropriate network destination.

The HLR 23 is typically a primary database repository of subscriber information used to provide control and intelligence in wireless networks. The HLR 23 thus contains a record of subscriber information such as features selected by the subscriber as part of the mobile service plan (e.g., call forwarding, calling name service, etc.), status of the subscriber (e.g., active, inactive, suspended service, etc.), the subscriber's mobile directory number (i.e., the number a calling party has to call to reach the mobile subscriber), information about the current geographic location of the mobile subscriber, etc. The HLR 23 may be shared by more than one MSC 12,14. The HLR 23 is generally managed by the wireless service provider company and represents the "home" database of subscribers who have subscribed for the wireless service in that home area served by the wireless service provider.

The VLR 24 is a database that primarily maintains temporary records associated with individual network subscribers. Thus, the VLR 24 represents a "visitor's" database for mobile subscribers who are being served in a defined local area. The VLR 24 is also managed by a wireless service provider. However, the VLR 24 and the HLR 23 may be managed by the same or by different wireless service providers depending on the current geographic location of the mobile subscriber in the wireless network. The term "visitor" may refer to a mobile subscriber who is being served by one or many systems in the home service area, or an MS who is roaming in a non-home, or "visited", service area (i.e., service area of a service provider that is different from the service provider the MS has signed up with). The VLR 24 generally contains subscriber location, status, and service features information that is derived from the relevant HLR, here, the HLR 23. The serving MSC 14 may access its associated VLR 24 to retrieve information therefrom for the handling of calls to and from visiting subscribers. Similar to the HLR 23, the VLR 24 may also serve one or more MSCs as illustrated in FIG. 1.

The LIDB database 26 is typically maintained by each telecommunications service provider as part of its subscriber account management. The LIDB database 26 may store caller-specific information (also interchangeably referred to herein as the 'calling name information'), e.g., the name of the caller, the telephone number of the caller, etc. A call sent to an MS invariably involves the PSTN 18 as part of the call connection process. The calling party information may be placed in the LIDB database 26 when a call is placed from the external network (e.g., the PSTN 18) to the wireless network. The external network, typically the PSTN 18, may store the calling name information in the LIDB database 26 for a number of reasons, e.g., to validate identity of the caller in the case of collect calls or third party calls.

The implementation of an enhanced call return (ECR) feature in a wireless telephone network is facilitated by the use of a set of messages provided by one of the WIN (wireless intelligent network) standards, e.g., the IS-41 standard. The ECR feature allows the mobile subscriber to access caller-specific information for more than one predetermined past caller. Thus, in the event that the MS is unable to answer a call or the caller hangs up prior to the MS answering the call, the mobile subscriber may activate the ECR service by dialing an access code, e.g., *69. The caller-specific information stored in the IP 20 in the mailbox created for the MS may then be accessed by the MS as discussed in detail hereinafter.

Figure 2:
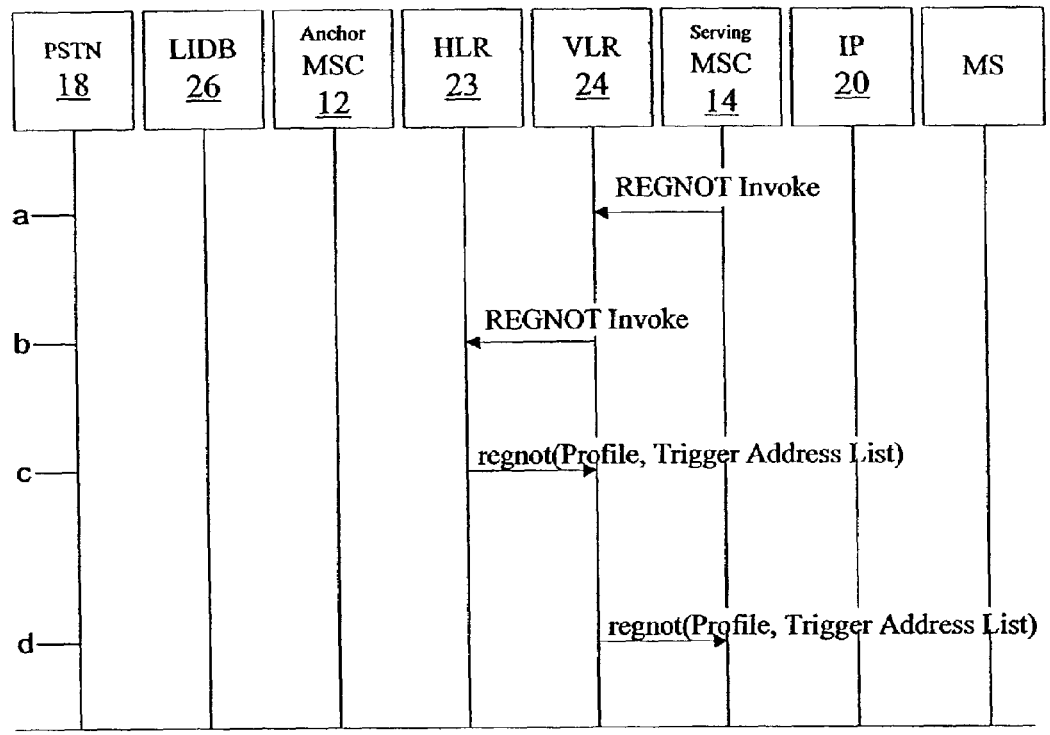
FIG. 2 depicts a prior art IS-41 messaging for a mobile subscriber registration process in a wireless network.
Figure 5:
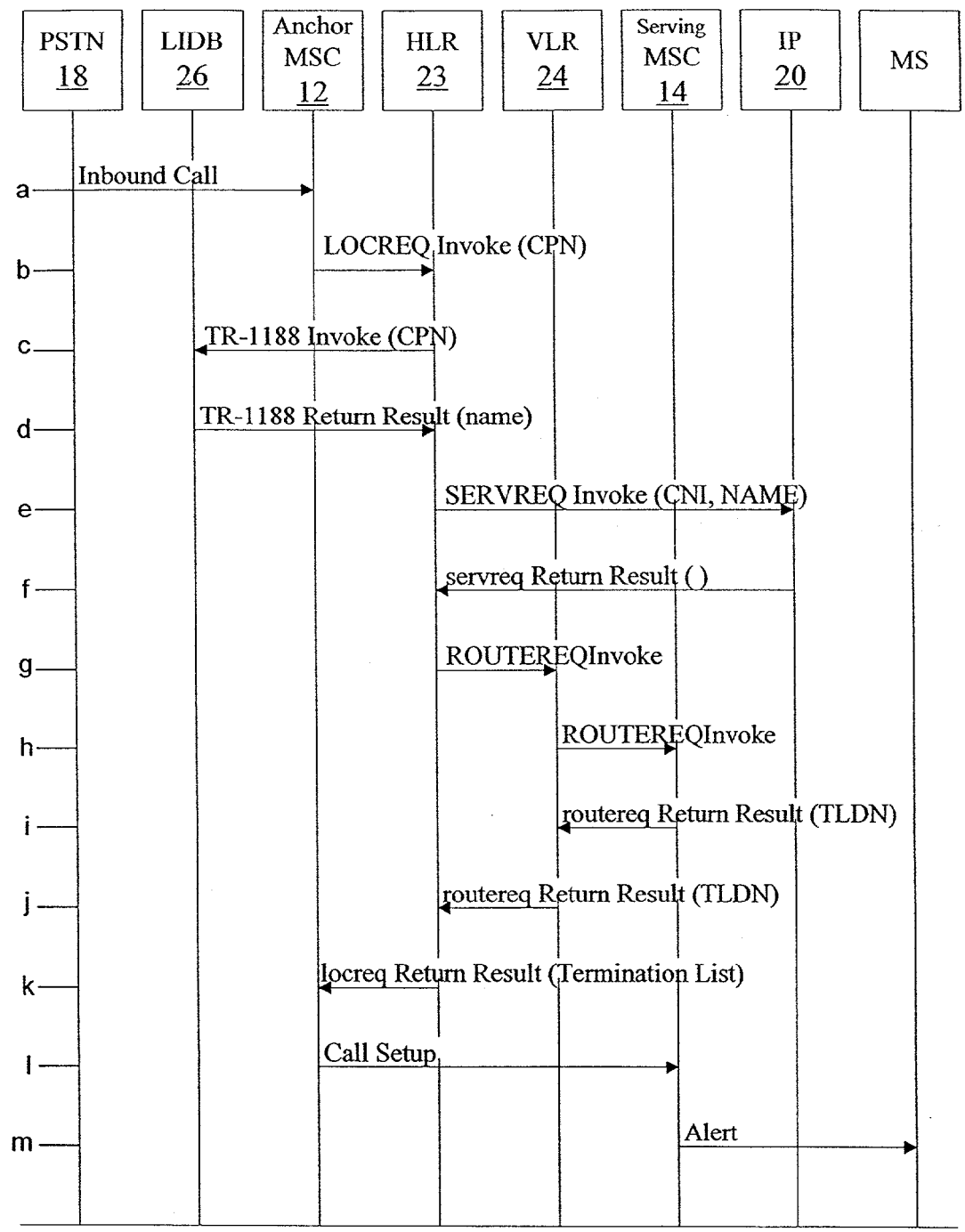
FIG. 5 shows an exemplary sequence of IS-41 messages that may be used to store caller-specific information in a mailbox created in the intelligent peripheral (IP) for the called party (i.e., the mobile subscriber)
Figure 15:
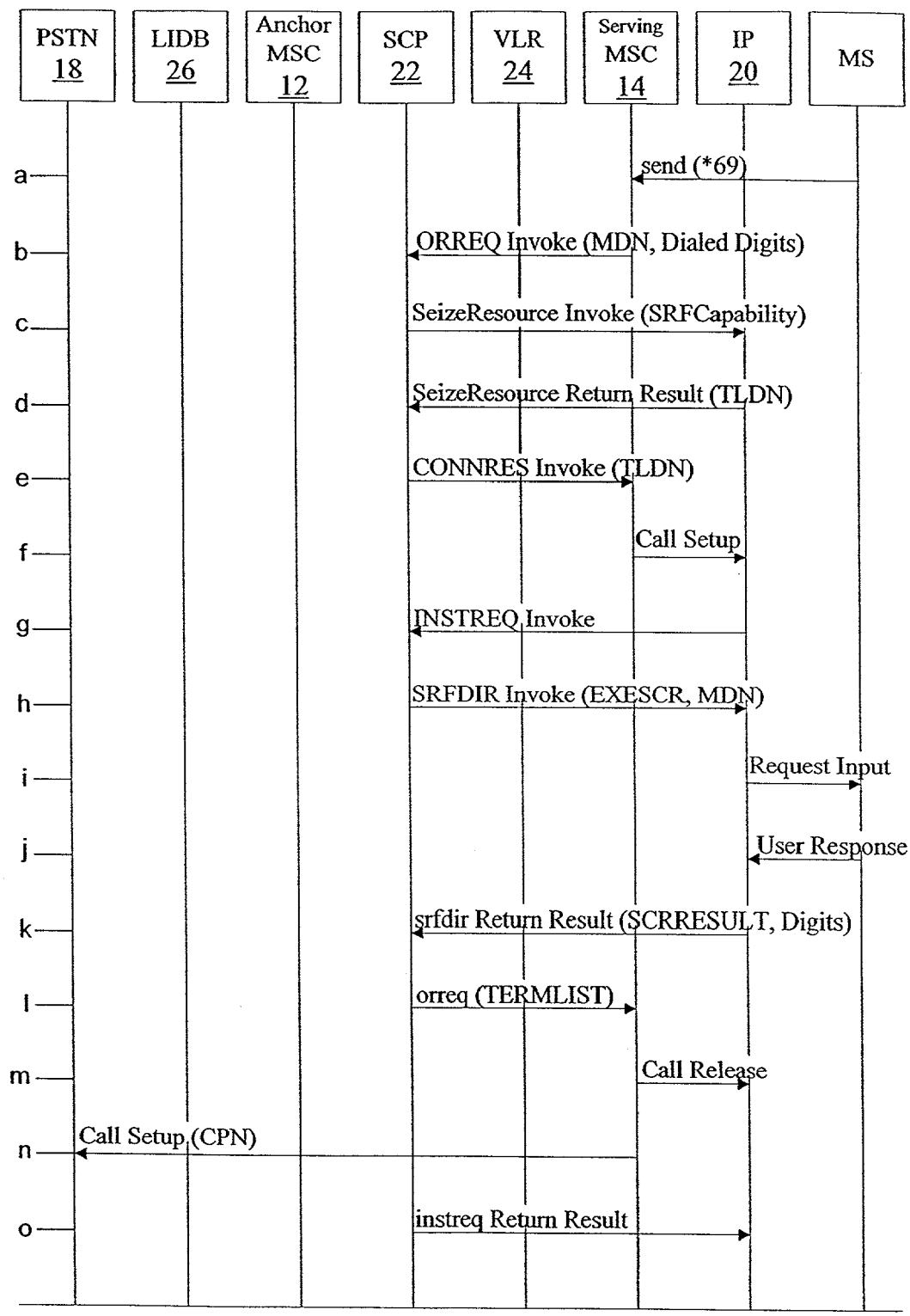
FIG. 15 illustrates an exemplary messaging scheme whereby a modified SRFDIR Invoke message may be utilized to allow a mobile subscriber to interact with the IP to retrieve the call return information from the subscriber's mailbox in the IP.

By way of explanation, in FIGS. 2, 5 and 15, a "Request" is sent from a first network entity to invoke an application process in a remote network entity, whereas a "Result" is returned by the remote network entity to send the results of the application process execution to the first network entity as indicated by the paired Request-Result messaging illustrated in FIGS. 2, 5 and 15. The sequence of "Request" and "Result" messages may be needed to complete an associated IS-41 "operation." It is conventional to represent the Invoke component acronym of an operation (e.g., the Location Request operation) in all-capital letters (e.g., LOCREQ) and the Return-Result component acronym in all-lowercase letters (e.g., locreq) as is shown in FIGS. 2, 5 and 15 for relevant messages.

Referring now to FIG. 2, a prior art IS-41 messaging for an MS registration process 30 in a wireless network (not shown) is depicted. The MS registration process 30 is initiated when an MS (not shown) first registers with the wireless network. At step (a), the serving MSC (e.g., the MSC 14) transmits a REGNOT (registration notification) Invoke message to its associated VLR (e.g., the VLR 24) requesting subscriber profile information for the newly-registered (or "visiting") MS. An exemplary message format for a REGNOT Invoke message 32 is illustrated in FIG. 3. Additional information about the REGNOT Invoke message may be obtained by consulting chapter 5 of the TIA/EIA-41, revision D. The registration notification operation is used to report (to the HLR 23 for the MS) the location of the MS (including the VLR and the MSC currently serving the MS) and, optionally, (1) to validate the MS identity, or (2) to validate the MS and obtain its profile information (from the HLR storing the information about the MS). The HLR for the MS (e.g., the HLR 23) may normally require location update notification (through, e.g., the REGNOT Invoke message 32) when the MS changes service areas.

It is noted that one or more fields within an IS-41 message (e.g., the REGNOT Invoke message 32 in FIG. 3) may be 'optional' (as indicated by letter "O") and some other fields within that message may be 'mandatory' or 'required' (as indicated by letter "M") to form a valid IS-41 message. For example, in the REGNOT Invoke message 32, the Mobile Identification Number (MIN) field and the Electronic Serial Number (ESN) field, among others, are mandatory; however, the Transaction Capability (TRANSCAP) and the WIN Capability (WINCAP) fields, among others, are optional. The total length (in octets) of the 'length' field (and, thus, of the REGNOT Invoke message 32 itself) may vary depending on the content of the optional fields included within the REGNOT Invoke message 32.

The REGNOT operation may invoke many functions, e.g., location update, service qualification, authentication reporting, SMS functions, etc. In the messaging shown in FIG. 2, the REGNOT Invoke message 32 from the serving MSC 14 to its associated VLR 24 has the TRANSCAP (transaction capability) parameter set to indicate that the serving MSC 14 may process the TRIGADDRLIST (trigger address list) parameter in the Registration Notification Return Result (regnot Return Result) message (shown in FIG. 4) from the HLR 23. The WINCAP (wireless intelligent network capability) parameter in the REGNOT Invoke message indicates which triggers the serving MSC 14 may support in the TRIGADDRLIST parameter. The HLR 23 may not include those triggers in the TRIGADDRLIST parameter which may not be supported by the serving MSC 14.

A "trigger" may include an event or an occurrence of a condition that is used to initiate a call processing function. A "trigger" may be useful during a digit analysis process. For example, a trigger (in the TRIGADDRLIST from the HLR 23) may inform the serving MSC 14 that the MS has subscribed to a service that allows for call origination to a number beginning with the "*" digit (e.g., *69 dialing for the ECR service). Therefore, when the serving MSC 14 detects such a trigger condition (i.e., number preceded by a "*"), it sends an Origination Request Invoke message (ORREQ Invoke message shown in FIG. 16) to the MS's HLR 23 as described hereinafter with reference to FIG. 15. The ORREQ Invoke message allows the HLR 23 to evaluate the dialed digits and to provide routing instructions to the serving system via the Origination Request Return Result (orreq) message as shown in FIG. 15.

At step (b) in FIG. 2, the VLR 24 associated with the serving MSC 14 forwards the REGNOT Invoke message to the MS's HLR 23. The HLR 23, in turn, returns to the requesting VLR 24 the profile information for the MS through the Registration Notification Return Result message (regnot Return Result) at step (c). An exemplary message format for a regnot Return Result message 34 is illustrated in FIG. 4. The TRIGADDRLIST (trigger address list) parameter has been added to the regnot Return Result message 34 under WIN standard IS (Interim Standard)-771, which, at the time of this writing, is yet to be incorporated into the TIA/EIA-41 standard. Therefore, additional information about the regnot Return Result message may be obtained by consulting chapter 5 of the TIA/EIA-41, revision D, and the pertinent documents in the IS-771 standard.

The profile information in the regnot Return Result message 34 may include validation and service information stored in the HLR 23 for the MS, e.g., the verification of the identity of the MS and the services the MS is authorized to use. The serving MSC 14 may use this information to tailor the telecommunications services it provides to the visiting MS. Finally, at step (d), the VLR 24 forwards the received regnot Return Result message 34 to the serving MSC 14 as shown in FIG. 2. This completes the initial registration process for the visiting MS when that MS (not shown) is first detected in the serving MSC's 14 service area. In other words, the serving MSC 14 may now "identify" the MS and may, therefore, complete calls originated to and from the MS according to the service profile information received from the MS's HLR 23.

The messaging scheme discussed hereinbelow with reference to FIG. 5 illustrates an example of how some of the TIA/EIA-41 (prior art) messages may be used in a novel way to enable call return functionality (i.e., the ECR feature) in a mobile wireless network. The SERVREQ Invoke message may be used to load a mobile subscriber's mailbox in an IP 20 within the wireless network with caller-specific information for a predetermined number of callers who placed calls in the past to the MS. The caller-specific information stored in the LIDB 26 may thus be loaded into an MS-specific mailbox within the IP 20. The SERVREQ Invoke message may also be used in a similar manner to store other kind of information (from the LIDB 26), e.g., specific subscriber-related voice or numerical messages, in the MS's mailbox.

Turning now to FIG. 5, an exemplary sequence 36 of IS-41 messages that may be used to store caller-specific information in a mailbox created in the intelligent peripheral (IP) 20 for the called party (i.e., the mobile subscriber) is illustrated. At step (a), a call originated from an external telephone network (e.g., the PSTN 18 or another wireless network) is received by the anchor MSC (e.g., the MSC 12 in FIG. 1). Such a call may be referred to as a 'mobile-terminated call.' Mobile-terminated calls are established from a telecommunications terminal (i.e., the 'calling party' or the 'caller'), which can be either within or outside of the mobile telecommunications network, to an MS (i.e., the 'called party' or the 'callee'). At step (b), the anchor MSC 12 launches a Location Request Invoke (LOCREQ Invoke) message to the MS's HLR 23 upon receiving the indication of call initiation (i.e., upon receiving the call placed by a caller with the MS as a callee thereof). An exemplary message format for a LOCREQ Invoke message 37 is illustrated in FIG. 6. Additional information about the LOCREQ Invoke message may be obtained by consulting chapter 5 of the TIA/EIA-41, revision D. The anchor MSC 12 transmits the LOCREQ Invoke message to "inform" the HLR 23 of the receipt of a mobile-terminated call and, thus, to obtain call-treatment instructions from the HLR 23, e.g., how to route the call.

The caller typically dials the MS's mobile directory number (MDN) to place a call to that MS. This MDN indicates to the anchor MSC 12 that a mobile-terminated call has been received and the same needs to be processed to connect the caller to the MS (i.e., the callee). The LOCREQ Invoke message 37 from the anchor MSC 12 to the associated HLR 23 may include the digits dialed by the caller to place a call to the MS (typically, the MDN for the MS) in the Digits (Dialed) field and may additionally include the digits in the telephone number of the calling party in the Calling Party Number (CPN) Digits field. The calling party number may be part of the calling name information transmitted by the call-originating network (e.g., the PSTN 18). Upon receipt of the LOCREQ Invoke message 37, the HLR 23 determines whether the called party (i.e., the mobile subscriber) has subscribed to the ECR service and also the status of the ECR service i.e., whether the service is active or inactive (due to, e.g., non-payment).

If the HLR 23 determines that the MS is authorized to use the ECR feature, then, at step (c), the HLR 23 transmits a Caller Name query to the LIDB 26 via a TR-1188 Invoke message 38 (FIG. 7) that contains the calling party number (CPN) or calling directory number field to identify the associated caller in the LIDB 26. The TR-1188 messages (including the TR-1188 Invoke message 38 and the TR-1188 Return Result message 39 (FIG. 8)) provide an interface between a wireless network and a wire line network. The TR-1188 messages are SS7 TCAP (Transaction Capabilities Application Part) messages that are used by wireline networks to support calling name capability. Therefore, with the TR-1188 messages, the HLR 23 may retrieve one or more parts of the caller-specific information stored in the LIDB 26 by the PSTN 18. The HLR 23 may perform signaling functions similar to those performed by an SCP (e.g., the SCP 22) while launching the TR-1188 Invoke query 38 to the LIDB database 26. Upon receiving the TR-1188 Invoke message 38, the LIDB database 26 determines, at step (d), if any calling name restrictions have been imposed by the calling party. In the absence of any calling name restriction, the LIDB 26 returns the calling name of the caller via the TR-1188 Return Result message 39 (i.e., through the generic name parameters in the message) to the HLR 23. FIGS. 7 and 8 respectively illustrate exemplary message formats for the SS7 TR-1188 Invoke message 38 and the TR-1188 Return Result message 39.

At step (e) in FIG. 5, the HLR 23 sends a SERVREQ (service request) Invoke message containing the calling party name (if available), calling party telephone number (represented by the CNI (calling number information) field, which is also referred to as Calling Party Number Digits field) and the called party MDN to the IP 20. An exemplary message format for a SERVREQ Invoke message 41 is illustrated in FIG. 9. Additional information about the SERVREQ Invoke message may be obtained by consulting chapter 5 of the TIA/EIA-41, revision D. A SERVREQ Invoke message 41 is used by a network entity to invoke specific service logic execution on another network entity containing service logic for the requested service(s). Here, the HLR 23 uses the SERVREQ Invoke message 41 to load the MS mailbox (created in the IP 20 when the MS subscribes to the ECR feature) in the IP 20 with pertinent caller-specific information. The number of callers whose calling name information may be stored in the IP 20 via individual SERVREQ Invoke messages 41 (generated per inbound call) may be predetermined by the mobile service provider. Therefore, the IP 20 may discard one or more caller-specific information to maintain the total number of callers whose information are stored in the MS's mailbox within the predetermined number specified by the service provider.

The intelligent peripheral 20, preferably a voice response unit (VRU) (not shown) within the IP 20, timestamps the contents of the SERVREQ Invoke message 41 and stores them in the MS's mailbox (as identified by the MDN supplied through the SERVREQ Invoke message 41). In other words, the IP 20 has a record of the date and time of the received call along with the calling name information (i.e., the name and the telephone number of the caller), which may later be accessed by the MS (as described hereinbelow) as part of the ECR service. The IP 20 acknowledges the successful completion of the service requested by transmitting a Service Request Return Result (servreq Return Result) message to the HLR 23 at step (f). An exemplary message format for a servreq Return Result message 42 is illustrated in FIG. 10. Additional information about the servreq Return Result message 42 may be obtained by consulting chapter 5 of the TIA/EIA-41, revision D.

In an alternative embodiment, the SERVREQ Invoke message 41 may be modified to include the Generalized Time parameter 43 (FIG. 11) to specify time-of-day, day-of-month, month and year information. Here, the HLR 23 may provide the time information through the SERVREQ Invoke message 41 thus modified. The IP 20 may not need to perform the timestamping operation as described hereinbefore in the preceding paragraph. An exemplary message format for the Generalized Time parameter 43 is illustrated in FIG. 11. Additional information about the Generalized Time parameter 43 may be obtained by consulting chapter 5 of the TIA/EIA-41, revision D.

After loading the caller-specific information into the MS's mailbox in the IP 20, the HLR 23, in response to the earlier-sent LOCREQ Invoke message 37, transmits at step (g) a ROUTEREQ (Routing Request) Invoke message to the VLR 24 associated with the serving MSC 14. An exemplary message format for a ROUTEREQ Invoke message 44 is illustrated in FIG. 12. Additional information about the ROUTEREQ Invoke message 44 may be obtained by consulting chapter 5 of the TIA/EIA-41, revision D.

The HLR 23 obtains the information regarding the destination VLR (e.g., the VLR 24) and the serving MSC 14 (that is currently serving the MS) through the REGNOT operation as discussed hereinbefore with reference to FIG. 2. The HLR 23 initiates the ROUTEREQ operation to query the serving system as to the preferred method of routing the pending call to the MS identified via the digits dialed by the caller (e.g., the MDN) as supplied in the LOCREQ Invoke message 37. The VLR 24 forwards the ROUTEREQ Invoke message 44 received from the HLR 23 to the serving MSC 14 at step (h). The serving MSC 14 allocates a TLDN (temporary local directory number) for the call and transmits that TLDN (as part of the requested routing information) to the VLR 24 through a Digits (Destination) field in the Routing Request Return Result (routereq Return Result) message at step (i). An exemplary message format for a routereq Return Result message 45 is illustrated in FIG. 13. Additional information about the routereq Return Result message 45 may be obtained by consulting chapter 5 of the TIA/EIA-41, revision D. The VLR 24 forwards the TLDN-containing routereq Return Result message 45 to the HLR 23 at step (j). However, in an alternative embodiment, the HLR 23 may transmit the ROUTEREQ Invoke message 44 directly to the serving MSC 14, which, in turn, may directly send the routereq Return Result message 45 to the HLR 23.

In mobile telecommunications, a TLDN may be required to deliver a call to a roaming subscriber (i.e., the MS). A TLDN is a real NANP (North American Numbering Plan) directory number that is assigned by the serving system to roaming subscribers for a brief period (e.g., about 20 seconds) to support call delivery. The NANP allocates unique 10-digit directory numbers (e.g., regular 10-digit phone numbers) to telephone service subscribers. The serving MSC 14 assigns and maps the TLDN to the MS's identity at the serving system. The incoming call is redirected (by the anchor or originating MSC 12 as discussed hereinbelow) to the serving MSC 14, via the PSTN 18, using the TLDN as the called party's "actual" phone number. The call may then be established to the MS at the serving system. A set of NANP directory numbers are reserved by service providers as TLDNs and the TLDNs are not permanently assigned to mobile subscribers in the system. TLDNs are dynamically allocated and released when call delivery is completed.

Upon receiving the routereq Return Result message 45 with TLDN, the HLR 23 transmits a locreq (location request) Return Result message to the originating MSC 12 at step (k). An exemplary message format for a locreq Return Result message 46 is illustrated in FIG. 14. Additional information about the locreq Return Result message 46 may be obtained by consulting chapter 5 of the TIA/EIA-41, revision D. The transmission of the locreq Return Result message 46 completes the location request operation initiated by the LOCREQ Invoke message 37 transmitted earlier by the anchor MSC 12 at step (b). If the serving MSC 14 and the anchor MSC 12 are the same, then the route request operation may not be needed. However, when additional call routing is required, then the 'termination list' parameter in the locreq Return Result message 46 may contain the TLDN received from the new serving MSC 14. The anchor MSC 12 then routes the inbound call to the serving MSC 14 using the TLDN at step (l). The serving MSC 14 associates the incoming call to the TLDN with the previous ROUTEREQ Invoke message 44 identifying the MS (not shown) as the recipient of the incoming call. Therefore, at step (m), the serving MSC 14 "pages" the handset (or any other suitable communication device used by the mobile subscriber) to alert the mobile subscriber of the incoming call. A call is established between the MS and the caller when the MS answers in response to the "paging" by the serving MSC 14.

Once the call is established between the MS and the calling party (as described hereinbefore with reference to the messaging scheme illustrated in FIG. 5), the MS may continue the conversation with the caller. However, in the event that the mobile subscriber is unable to answer the call or the caller hangs up prior to the mobile subscriber answering the call, the mobile subscriber may activate the enhanced call return service by dialing an access code, e.g., *69, as discussed hereinbelow with reference to FIG. 15. Upon activation of the ECR service, the mobile subscriber may be allowed to interact with the IP 20 (preferably through the VRU in the IP 20) to obtain caller-specific information for a predetermined number of past callers from the MS's mailbox in the IP 20.

Referring now to FIG. 15, an exemplary messaging scheme 50 whereby a modified SRFDIR Invoke message 60 (FIG. 21) may be utilized to allow a mobile subscriber to interact with the IP 20 to retrieve the call return information from the subscriber's mailbox in the IP 20 is illustrated. The serving MSC 14 receives the access code (e.g., "*69") dialed by the MS to access the ECR service at step (a) in FIG. 15. As noted hereinbefore, when the serving MSC 14 detects a trigger condition (e.g., a number preceded by a "*"), it sends an Origination Request Invoke message (ORREQ Invoke) to the MS's HLR 23. An exemplary message format for an ORREQ Invoke message 51 is illustrated in FIG. 16. Additional information about the ORREQ Invoke message 51 may be obtained by consulting chapter 5 of the TIA/EIA-41, revision D. The HLR 23 may include the SCP 22 and, hence, the HLR 23 may perform SCP-type functions such as, e.g., receiving the ORREQ Invoke message 51 from the serving MSC 14 at step (b). The ORREQ Invoke message 51 allows the HLR 23 (i.e., the SCP 22 within the HLR 23) to evaluate the dialed digits (here, digit "6" followed by digit "9") and to provide routing instructions to the serving system via the Origination Request Return Result (orreq) message at step (l) as described hereinbelow. In an alternative embodiment, the serving MSC 14 may send the ORREQ Invoke message 51 directly to an independent SCP that may not be part of an HLR.

An origination request operation (implemented by the ORREQ Invoke message and the orreq messages) is used to request call origination treatment on behalf of a registered MS. The MS registration process has been described hereinbefore with reference to FIG. 2. An MSC (i.e., the serving MSC 14) sends an ORREQ Invoke message 51 to an SCP (i.e., the SCP 22 within the HLR 23) notifying the service logic (not shown) within the SCP 22 that an MS origination trigger criterion has been satisfied. The ORREQ Invoke message 51 may include as much information as is known at the current state of the call so that the service logic within the SCP 22 may use that information. In the messaging scheme illustrated in FIG. 15, the ORREQ Invoke message 51 may include the dialed digits (i.e., the number "69") and the MDN (mobile directory number) for the MS registered with the serving MSC 14.

Prior to generating the Origination Request Return Result (orreq) message, the SCP 22 (or the HLR 23 functioning as the SCP 22) may transmit a Seize Resource Invoke message to the IP 20 at step (c) (FIG. 15) to request reservation of a specific resource (e.g., the MS's mailbox) or a set of specialized resources within the IP 20. This action prepares the IP 20 for interactions with a device, e.g., the handset (not shown) of the mobile subscriber. An exemplary message format for a Seize Resource Invoke message 52 is illustrated in FIG. 17. Additional information about the Seize Resource Invoke message 52 may be obtained by consulting chapter of the TIA/EIA-41, revision D. The specialized resource (i.e., standard specialized resource) parameter and the private specialized resource parameter (in the Seize Resource Invoke message 52) together define the SRFCapability (Specialized Resource Function Capability) parameter. The SRFCapability parameter identifies the specialized resource capabilities (within the IP 20) requested by the SCP 22. The invocation of the interactive implementation of the ECR functionality through the IP 20 may be indicated by inclusion of the standard specialized resource parameter within the Seize Resource Invoke message. The caller-specific information stored in the mailbox of the mobile subscriber may be considered part of the private specialized resource stored within the IP 20.

The IP 20 shows its willingness to provide access to the requested specialized resource by transmitting a TLDN in the Seize Resource Return Result message to the SCP 22 at step (d). An exemplary message format for a Seize Resource Return Result message 53 is illustrated in FIG. 18. Additional information about the Seize Resource Return Result message 53 may be obtained by consulting chapter 5 of the TIA/EIA-41, revision D. The TLDN transmitted by the IP 20 through the Seize Resource Return Result message 53 may be the same or may be different from the TLDN described hereinbefore with reference to the routereq Return Result message 45 in FIG. 5. The TLDN received from the IP 20 may be used by the serving MSC 14 to set up a call to the IP 20 as described hereinbelow.

The SCP 22 (within the HLR 23) forwards the TLDN received from the IP 20 at step (d) to the serving MSC 14 in a CONNRES (connect resource) Invoke message at step (e). An exemplary message format for a CONNRES Invoke message 54 is illustrated in FIG. 19. Additional information about the CONNRES Invoke message 54 may be obtained by consulting chapter 5 of the TIA/EIA-41, revision D. A Connect Resource operation provides part of the protocol needed to support IP interactions in a wireless network. The CONNRES Invoke message 54 is sent from an SCP (i.e., the SCP 22 within the HLR 23) to a serving MSC (i.e., MSC 14), instructing the serving MSC 14 to connect the indicated call to the specified IP 20 for access to a special resource within the IP 20. When an SCP resides within an HLR, the SCP may initially send the CONNRES Invoke message 54 to the HLR, which, in turn, may transfer the message to the appropriate MSC. A CONNRES Invoke message 54 may not have a Return Result message associated with it. However, upon transmitting the CONNRES Invoke message 54 to the serving MSC 14, the SCP 22 may wait for an acknowledgement from the IP 20 (e.g., the INSTREQ Invoke message as described hereinbelow) giving the SCP 22 an indication of the call connection to the IP 20. Sample operation scenarios for the Connect Resource operation are illustrated in chapter-3 of the TIA/EIA-41, revision D.

The serving MSC 14 sets up a call, at step (f) in FIG. 15, to the IP 20 using the TLDN received in the CONNRES Invoke message 54. Upon connection, the IP 20 transmits, at step (g), an INSTREQ (instruction request) Invoke message to the SCP 22 requesting instructions from the SCP 22 regarding the service being invoked. An exemplary message format for an INSTREQ Invoke message 55 is illustrated in FIG. 20. Additional information about the INSTREQ Invoke message 55 may be obtained by consulting chapter 5 of the TIA/EIA-41, revision D. An Instruction Request operation is used when an SRF (Special Resource Function) within the IP 20 determines that one of the SRF's resources, allocated by the Seize Resource operation, has been seized. The SRF (not shown) within the IP 20 may wait for an SRFDIR Invoke message (defined hereinbelow with reference to FIG. 21) or an Instruction Request Return Result message (shown in FIG. 24) from the SCP 22 as an acknowledgment of its earlier INSTREQ Invoke message 55 as well as a source of further call processing instructions.

Figure 21:
FIG. 21 shows an exemplary message format for the SRFDIR Invoke message.

In the messaging scheme shown in FIG. 5, the SCP 22 sends an SRFDIR (specialized resource function directive) Invoke message to the IP 20 at step (h) in response to the earlier INSTREQ Invoke message 55 from the IP 20. An exemplary message format for an SRFDIR Invoke message 60 is illustrated in FIG. 21 and discussed hereinbelow with reference thereto. The SRFDirective operation may be used by the service control logic within the SCP 22 to direct the operation of the IP 20 that provides user interaction. The SRFDIR Invoke message 60 may contain an EXESCR (execute script) parameter (as part of controlling specialized resources within the IP 20) specifying which audio or video script (already stored in the IP 20) is to be executed by the IP 20. The SRFDIR Invoke message 60 thus instructs the IP 20 to access the specialized resource (i.e., the mailbox for the MS) stored therein via interaction with the MS (not shown) upon execution of a specified script. Some examples of the SRFDirective operation may be found in chapter-3 of the TIA/EIA-41, revision D.

Referring now to FIG. 21, an exemplary message format for the SRFDIR Invoke message 60 to facilitate interaction between the IP 20 and an MS is illustrated. The SRFDIR Invoke message 60 shown in FIG. 21 is a modified from the prior art SRFDIR Invoke message (not shown) to include an "access key" field (e.g., the Mobile Directory Number field) that identifies the MS the IP 20 is to interact with. The "access key" allows direct addressing of the IP 20 so as to enable the IP 20 to access a specific mailbox for a specific MS and, then, to interact with the MS. In other words, the modified SRFDIR Invoke message 60 allows the IP 20 to identify the MS (and its mailbox) as well as to initiate interaction with that MS. The SRFDIR Invoke message 60 may be used by the SCP 22 to command the IP 20, e.g., to play an announcement to the MS or to collect digits (entered by the MS through the mobile handset keypad) that may later be returned to the SCP 22 as discussed hereinbelow. The SRFDIR Invoke message 60 may further include an 'Execute Script' (EXESCR) field, which provides the IP 20 with information (e.g., memory location address) necessary to access one or more audio or video scripts stored within the IP 20 and then to execute those scripts.

Returning now to FIG. 15, after receiving the SRFDIR Invoke message 60, the IP 20 executes, at step (i), the audio or video script stored therein at a location referred to in the EXESCR field within the SRFDIR Invoke message 60. The script being executed by the IP 20 may include audio instructions inviting the MS to interact with the IP 20 and to input one or more choices (through appropriate digits on the mobile handset) suggested in the audio instructions being played by the IP 20. Alternatively, in the absence of voice-based interaction, the IP 20 may provide a displayed set of options on the mobile handset if the mobile handset has a built-in display. The instructions (stored in the IP 20) referred to by the EXESCR field within the SRFDIR Invoke message 60 may include an executable computer program, which, upon execution, may prepare the IP 20 to perform a specialized resource function (e.g., to play an announcement, to collect digits dialed by the MS and/or to recognize voice input from the MS). For execution of an audio script, the IP 20 may include an interactive voice response unit (IVR) (not shown) that may "read" (e.g., in a synthesized speech) the calling party's name, the calling party's telephone number and the time the calling party's call was received in the MS's mailbox to the MS and may "listen" for spoken commands from the MS or may accept direct input (in the form of digits dialed on the mobile handset) from the MS (in response to the options "read" by the IVR) to initiate the desired action.

A sample script that may be "announced" by the IVR unit (not shown) in the IP 20 using pre-recorded digitized human voice samples is given below. It is noted that the IVR unit may include an audio speech processing unit, e.g., a DIALOGIC® speech processing card manufactured by Dialogic Corporation, 1515 Route 10, Parsippany, N.J., USA 07054, to generate human voice announcements upon execution of the specified script. The following sample script "announcement" also includes options given to the MS by the IP 20 to input a choice by pressing (or dialing) a digit on the mobile handset. Alternatively, the MS may be prompted to speak a choice, and a speech recognition unit (not shown) in the IVR unit may detect what option the MS has selected during the script announcement. In the sample announcement script below, the words NAME, NUMBER and TIME are variables that may be filled-in by the IVR (while converting that information into audible speech) based on the data stored in the MS's mailbox in the IP 20. The "speech" part of the executed script is shown in italics, whereas the data input part (i.e., the interaction between the MS and the IP 20) is printed as normal text within the announcement script given below.

Sample Announcement Script

First Announcement
  Please: Press 1 to send current selection [to be dialed by the serving MSC 14]
    Press 2 to scroll down
    Press 3 to scroll up
    Press 9 to end this call Second Announcement
  Caller: (NAME, NUMBER, who called at TIME)

IVR Waits for an Input from the MS
    if input=1, then IVR places selected caller's number into the 'digits' parameter of the srfdir Return Result message to be sent to the SCP 22
    if input=2, then IVR "scrolls down" to the next selection stored in the MS's mailbox
    if input=3, then IVR "scrolls up" to the previous selection stored in the MS's mailbox
    if input=9, then IP sends termination designation to the SCP in srfdir Return Result (if no input is detected, then IVR proceeds to the next selection)

Third Announcement (when Input=2 or when No Input is Detected)
  Caller: (NAME, NUMBER, who called at TIME)

IVR Again Waits for an Input from the MS

. . . this process is repeated until all the callers stored in the MS's mailbox are covered.

It is noted that the caller information may be announced in a number of different ways, e.g., starting with the most recent caller first or starting with a caller whose first name appears first when all the caller names (stored in the mailbox for the MS) are arranged in alphabetical order. The response from the MS indicating which of the past callers to call may be in the form of DTMF (dual-tone multi-frequency) input digit(s) (dialed through the MS's handset) and may be interactively received by the IP 20 at step (j). The scrolling functionality may allow the MS to go backward or forward and thereby "scan" the caller-specific information for each of a number of past callers stored in the MS's mailbox. The ECR feature thus allows an MS to access caller-specific information (including the time of call reception) for not just the last (in time) caller, but for a predetermined number of past callers.

The MS may hang up after listening to the announcement from the IP 20. However, if the MS chooses a particular caller to place a call to (via voice input or via digit input selection during the announcement script execution), the IP 20 may convey the telephone number of the selected caller to the SCP 22 using the Digits parameter in a SRFDirective (srfdir) Return Result message at step (k). An exemplary message format for an srfdir Return Result message 62 is illustrated in FIG. 22. Additional information about the srfdir Return Result message 62 may be obtained by consulting chapter 5 of the TIA/EIA-41, revision D. A voice input from the MS may thus be converted into corresponding digit selection by the speech recognition unit (not shown) in the IP 20 prior to sending the corresponding calling party number (CPN) through the Digits parameter in the srfdir Return Result message. It is noted that sample messaging schemes for voice recognition features for one or more network entities (thereby allowing a mobile subscriber to interact with those network entities via voice inputs instead of keypad inputs) are illustrated in chapter-3 of the TIA/EIA-41, revision D.

The Digits parameter in the srfdir Return Result message 62 may contain "zero (0)" indicating either that the MS did not enter any digits before time-out or that all announcements were played to the MS without any subsequent input from the MS. The SCRRESULT (script result) parameter in the srfdir Return Result message 62 may indicate the result of the script required to be executed by the EXESCR parameter in the corresponding SRFDIR Invoke message 60. When the MS decides to place a call to one of the past callers from the MS's mailbox in the IP 20, the MS may indicate that selection in one of many ways, e.g., pressing the digit "1" on the mobile handset keypad as indicated hereinbefore in the sample announcement script. The selection entered by the MS (which is represented as the calling party telephone number in the Digits field of the srfdir Return Result message 62) is then returned to the serving MSC 14 via the orreq message (Origination Request Return Result message) from the SCP 22 to the serving MSC 14 at step (l) in FIG. 15. An exemplary message format for an orreq message 64 is illustrated in FIG. 23. Additional information about the orreq message 64 may be obtained by consulting chapter 5 of the TIA/EIA-41, revision D. The number of the party the MS wishes to establish a call to is conveyed to the serving MSC 14 via the TERMLIST (termination list) parameter in the orreq message 64.

In response to the orreq message 64 from the SCP 22, the serving MSC 14 may send a release message (the Call Release message) to the IP 20 at step (m). The release message may allow the IP 20 to free up the seized resource (i.e., the MS's mailbox) for other applications, if any. Thereafter, the serving MSC 14 may initiate a call at step (n) to the number contained in the TERMLIST parameter, i.e., the telephone number of one of the past callers (CPN) selected by the MS to be connected to. Finally, at step (o), the SCP 22 sends an instruction request Return Result message (the instreq Return Result message) to the IP 20 to indicate successful completion of instruction request operation initiated by the INSTREQ Invoke message 55 earlier at step (g). An exemplary message format for an instreq Return Result message 66 is illustrated in FIG. 24. Additional information about the instreq Return Result message 66 may be obtained by consulting chapter 5 of the TIA/EIA-41, revision D. The instreq Return Result message 66 may further signify to the IP 20 that operations with the seized resource (in the IP 20) have been successfully completed.

It is noted that various messages described hereinbefore with reference to FIGS. 2, 5 and 15 may also be implemented as defined in the Interim Standard (IS)-771 for wireless intelligent networks (WIN), except for the messages for the LOCREQ operation (i.e., the LOCREQ Invoke message and the locreq Return Result message) which may be implemented as defined in the IS-764 standard. Relevant portions of the IS-771 standard and the IS-764 standard are incorporated herein by reference.

The foregoing messaging schemes outlined in FIGS. 5 and 15 illustrate an example of how some of the TIA/EIA-41 messages may be used in a novel way to enable call return functionality (i.e., the ECR feature) in a mobile wireless network. The SERVREQ Invoke message may be used to load a mobile subscriber's mailbox in an IP within the wireless network with caller-specific information for a predetermined number of callers who placed calls in the past to the MS. The caller-specific information stored in the LIDB (line information database) may thus be loaded into an MS-specific mailbox within the IP. The SERVREQ Invoke message may also be used in a similar manner to store other kind of information (from the LIDB), e.g., specific subscriber-related voice or numerical messages, in the MS's mailbox.

A modified SRFDIR Invoke message with an added "access key" (e.g., the 'MDN' parameter in the exemplary SRFDIR Invoke message 60 shown in FIG. 21) may be used by the network service provider to access the mobile subscriber's mailbox in the IP and also to prepare the IP for interactive communication with the mobile subscriber. The IP may be configured to "interpret" voice commands/selections from the mobile subscriber in order to implement the ECR feature. The IP-based ECR service may allow a mobile subscriber to stay informed of any missed calls and also to be able to access one or more prior callers without the need to personally remember the caller-specific data (e.g., caller's name or telephone number). The ECR functionality may, however, be implemented with other messages (that may be from standards other than the TIA/EIA-41 standard) utilized in a manner similar to that described hereinbefore with reference to the SERVREQ Invoke and the SRFDIR Invoke messages.

While several preferred embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for providing enhanced call return in a wireless network, the method comprising:
   receiving a call placed to a mobile subscriber from a caller;
   capturing caller-specific information;
   storing the caller-specific information in a database;
   determining whether the mobile subscriber is a subscriber to an enhanced call return service;
   loading the mobile subscriber mailbox with the caller-specific information, wherein loading a mobile subscriber mailbox with the caller-specific information includes:
      retrieving the caller-specific information from the database, and
      storing the caller-specific information in an intelligent peripheral within
   the wireless network;
   establishing a connection between the mobile subscriber and the mobile subscriber mailbox;
   executing at least one of an audio and a video script stored within the intelligent peripheral, wherein the at least one of the audio and the video script prepares the intelligent peripheral to perform an interaction with the subscriber;
   utilizing the interaction to retrieve the caller-specific information by the intelligent peripheral from the mobile subscriber mailbox; and
   placing a return call to the caller.

2. The method of claim 1, wherein receiving the call includes receiving the call at an anchor mobile switching center within the wireless network.

3. The method of claim 1, wherein determining whether the mobile subscriber is a subscriber to the enhanced call return service includes having a home location register determine whether the mobile subscriber is a subscriber to the enhanced call return service.

4. The method of claim 1, wherein loading the mobile subscriber mailbox with caller-specific information includes loading the mobile subscriber mailbox with at least one of the name of the caller and the telephone number of the caller.

5. The method of claim 1, wherein retrieving the caller-specific information includes:
   informing a home location register of receipt of the call; and
   transmitting the caller-specific information to the intelligent peripheral.

6. The method of claim 5, wherein informing the home location register of receipt of the call includes transmitting a location request invoke message from an anchor mobile switching center to the home location register.

7. The method of claim 5, wherein transmitting the caller-specific information to the intelligent peripheral includes:
   transmitting a caller name query to the database; and sending a service request invoke message to the intelligent peripheral.

8. The method of claim 7, wherein transmitting the caller name query includes transmitting the caller name query via a TR-1188 invoke message.

9. The method of claim 7, wherein sending the service request invoke message includes sending a service request invoke message that includes: at least one of the caller's name and the caller's telephone number; and a mobile directory number associated with the mobile subscriber.

10. The method of claim 7, further comprising times tamping the service request invoke message.

11. The method of claim 7, further comprising transmitting a service request return result message to acknowledge receipt of the caller-specific information by the intelligent peripheral.

12. A method for providing enhanced call return in a wireless network, the method comprising:
   receiving a call placed to a mobile subscriber from a caller;
   determining whether the mobile subscriber is a subscriber to an enhanced call return service;
   loading a mobile subscriber mailbox with caller-specific information, the subscriber mailbox residing within a computing device; and
   establishing a connection between the mobile subscriber and the mobile subscriber mailbox, wherein establishing a connection between the mobile subscriber and the mobile subscriber mailbox includes:
allocating a temporary local directory number for the call,
forwarding the temporary local directory number to an anchor mobile switching center within the wireless network,
routing the call from the anchor mobile switching center to a serving mobile switching center within the wireless network,
executing at least one of an audio and a video script stored within the computing device, wherein the at least one of the audio and the video script prepares the computing device to perform an interaction with the subscriber,
utilizing the interaction to retrieve the caller-specific information from the mobile subscriber mailbox;
alerting the mobile subscriber of the call, and
placing a return call to the caller.

13. The method of claim 12, wherein allocating the temporary local directory number includes transmitting a route request invoke message from a home location register to the serving mobile switching center.

14. The method of claim 13, wherein transmitting the route request invoke message from the home location register to the serving mobile switching center includes transmitting the route request invoke message via a visitor location register.

15. The method of claim 12, wherein forwarding the temporary local directory number includes:
forwarding a routing request return result message from a serving mobile switching center to a home location register, wherein the routing return result message includes the temporary local directory number; and
forwarding a location request return result message from the home location register to the anchor mobile switching center, wherein the location request return result message includes the temporary local directory number.

16. The method of claim 15, wherein forwarding the routing request return result message includes forwarding the routing request return result message via a visitor location register.

17. The method of claim 12, wherein routing the call from the anchor mobile switching center to the serving mobile switching center includes routing the call using the temporary local directory number.

18. The method of claim 12, wherein alerting the mobile subscriber of the call includes paging a communication device used by the mobile subscriber.

19. A method for providing enhanced call return in a wireless network, the method comprising:
receiving a call placed to a mobile subscriber from a caller;
determining whether the mobile subscriber is a subscriber to an enhanced call return service;
loading a mobile subscriber mailbox with caller-specific information;
establishing a connection between the mobile subscriber and the mobile subscriber mailbox; and
retrieving the caller-specific information from the mobile subscriber mailbox, wherein retrieving the caller-specific information from the mobile subscriber mailbox includes:
receiving an indication to activate the enhanced call return service,
obtaining a temporary local directory number from the intelligent peripheral,
instructing the intelligent peripheral to access the mobile subscriber mailbox,
executing a script stored within the intelligent peripheral, to interact with the mobile subscriber and
placing a return call to the caller.

20. The method of claim 19, wherein receiving the indication to activate the enhanced call return service includes receiving an access code dialed by the mobile subscriber.

21. The method of claim 19, wherein obtaining the temporary local directory number includes:
detecting a trigger condition; and
sending an origination request invoke message from a serving mobile switching center to a home location register.

22. The method of claim 21, wherein sending an origination request invoke message includes sending an origination request invoke message that includes a mobile directory number associated with the mobile subscriber.

23. The method of claim 19, wherein instructing the intelligent peripheral to access the mobile subscriber mailbox includes sending a specialized resource function directive invoke message to the intelligent peripheral.

24. The method of claim 23, wherein sending the specialized resource function directive invoke message includes sending a specialized resource function directive invoke message that includes an access key field.

25. The method of claim 24, wherein the access key field includes a mobile directory number associated with the mobile subscriber.

26. The method of claim 23, wherein sending the specialized resource function directive invoke message includes sending a specialized resource function directive invoke message that includes an execute script field.

27. The method of claim 19, wherein executing the script stored within the intelligent peripheral includes executing at least one of an audio script and a video script.

28. The method of claim 19, wherein placing the return call to the caller includes:
receiving input from the mobile subscriber, wherein the received input is associated with the caller;
conveying a telephone number associated with the caller; and
establishing a connection between the mobile subscriber and the caller.

29. The method of claim 28, wherein conveying the telephone number includes transmitting a specialized resource function directive return result message that includes the telephone number of the caller.

* * * * *